(12) United States Patent
Gowda et al.

(10) Patent No.: US 12,430,190 B2
(45) Date of Patent: Sep. 30, 2025

(54) SYSTEM AND METHOD TO DETECT DATA STORAGE DRIVE FAILURES

(71) Applicant: Dell Products, L.P., Round Rock, TX (US)

(72) Inventors: Deepak Gowda, Cary, NC (US); Sudhir Vittal Shetty, Cedar Park, TX (US); Arun Rameshbabu, Torbay (CA); Francois Auger, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 6 days.

(21) Appl. No.: 18/346,343

(22) Filed: Jul. 3, 2023

(65) Prior Publication Data

US 2025/0013517 A1  Jan. 9, 2025

(51) Int. Cl.
| G06F 11/00 | (2006.01) |
| G06F 11/07 | (2006.01) |
| G06F 11/20 | (2006.01) |
| G06N 7/01  | (2023.01) |

(52) U.S. Cl.
CPC ...... *G06F 11/0751* (2013.01); *G06F 11/0727* (2013.01); *G06F 11/2023* (2013.01); *G06N 7/01* (2023.01)

(58) Field of Classification Search
CPC ............ G06F 11/0727; G06F 11/0751; G06F 11/2023
See application file for complete search history.

(56) References Cited

U.S. PATENT DOCUMENTS

| 9,678,817 | B1* | 6/2017 | Hasbun Pacheco ....... G06F 11/0727 |
| 10,191,668 | B1* | 1/2019 | Traylor ............... G06F 3/0689 |
| 10,572,323 | B1* | 2/2020 | Zhai ................... G06F 11/008 |
| 10,613,962 | B1* | 4/2020 | Delange ............. G06F 11/3006 |
| 11,188,564 | B1* | 11/2021 | Paterra ............... G06F 3/0617 |
| 2015/0205657 | A1* | 7/2015 | Clark ............... G06F 11/0727 714/47.3 |
| 2015/0234719 | A1* | 8/2015 | Coronado ............ G06F 11/203 714/6.3 |
| 2015/0269014 | A1* | 9/2015 | Nakatsugawa ...... G06F 11/079 714/47.3 |
| 2018/0210782 | A1* | 7/2018 | Gao .................. G06F 11/079 |
| 2018/0246789 | A1* | 8/2018 | Koga ................ G06F 11/0757 |
| 2020/0004435 | A1* | 1/2020 | Borlick .............. G06N 3/084 |
| 2020/0042212 | A1* | 2/2020 | Sokolovski ......... G06F 3/0689 |
| 2021/0073063 | A1* | 3/2021 | Kale ................. G06F 11/3058 |
| 2021/0149777 | A1* | 5/2021 | Gao .................. G06F 11/079 |

(Continued)

*Primary Examiner* — Joshua P Lottich
(74) *Attorney, Agent, or Firm* — Fogarty LLP

(57) ABSTRACT

Systems and methods for detecting data storage drive failures are described. In an illustrative, non-limiting embodiment, an Information Handling System (IHS) may include: a processor; and a memory coupled to the processor, where the memory includes program instructions store thereon that, upon execution by the processor, cause the IHS to: obtain data attributes of a data storage drive within a system of data storage drives; generate, based at least in part on the data attributes of the data storage drive, engineered features related to the system of data storage drives; and generate, using a trained artificial intelligence or machine learning model, and based at least in part on the engineered features, a probability of failure for the data storage drive.

20 Claims, 7 Drawing Sheets

(56) References Cited

U.S. PATENT DOCUMENTS

| | | | |
|---|---|---|---|
| 2022/0091915 A1* | 3/2022 | Perneti | G06F 3/0653 |
| 2022/0382616 A1* | 12/2022 | Brych | G06F 11/108 |
| 2023/0222032 A1* | 7/2023 | Jenkinson | G06F 11/076 |
| | | | 714/764 |

* cited by examiner

| ENGINEERED FEATURES | DESCRIPTION |
|---|---|
| THE OPERATIONAL TIME AVERAGE OF ALL DISKS IN A SINGLE SYSTEM. | IT REFERS TO THE AGE OF EACH DISK SINCE IT IS PUT INTO OPERATION AND THE AVERAGE OF ALL THE DISKS IN A GIVEN SYSTEM. |
| NUMBER OF DISK FAILURES IN A GIVEN SYSTEM OVER A LIFE SPAN. | |
| NUMBER OF DISK FAILURES IN A GIVEN SYSTEM IN THE FIRST YEAR OF OPERATION. | TO MAKE THE ML MODEL LEARN THE BATHTUB CHARACTERISTICS OF EARLY FAILURE. |
| NUMBER OF DISK FAILURES IN A GIVEN SYSTEM AFTER FIVE YEARS OF SERVICE. | TO MAKE THE ML MODEL LEARN THE BATHTUB CHARACTERISTICS OF LATE FAILURE. |
| THE NUMBER OF DISK FAILURES IN A GIVEN SYSTEM BETWEEN ONE YEAR AND FIVE YEARS OF SERVICE. | TO MAKE THE ML MODEL LEARN THE BATHTUB CHARACTERISTICS OF LONGER MID-PHASE. |
| NUMBER OF DISK FAILURES IN A GIVEN SYSTEM IN THE LAST 7 DAYS. | |
| NUMBER OF DISK FAILURES IN A GIVEN SYSTEM IN THE LAST 30 DAYS. | |
| NUMBER OF DISK FAILURES IN A GIVEN SYSTEM IN THE LAST 60 DAYS. | |
| NUMBER OF DISK FAILURES IN A GIVEN SYSTEM IN THE LAST 90 DAYS. | |
| NUMBER OF DISK FAILURES IN A GIVEN SYSTEM IN THE LAST 120 DAYS. | |
| NUMBER OF DISK FAILURES IN A GIVEN SYSTEM IN THE LAST 180 DAYS. | |
| THE STANDARD DEVIATION OF DISK CAPACITY USED FOR EACH DISK IN A SYSTEM (DAILY AND WEEKLY INTERVAL DATA). | |
| STANDARD DEVIATION OF DISK CAPACITY USED FOR ALL DISKS IN A SYSTEM (DAILY AND WEEKLY INTERVAL DATA). | |

ML MODEL PROBABILITY OF FAILURE MAPPED TO 2 INPUT FEATURES

ML MODEL OUTPUT

| DRIVE IDENTIFIER | MODEL PREDICTION | PROBABILITY OF FAILURE |
|---|---|---|
| 1 | NORMAL | 0.12 |
| 2 | NORMAL | 0.41 |
| 3 | NORMAL | 0.23 |
| 4 | FAILURE | 0.84 |
| 5 | NORMAL | 0.01 |
| 6 | NORMAL | 0.47 |
| 7 | NORMAL | 0.21 |

SYSTEM AND METHOD TO DETECT DATA STORAGE DRIVE FAILURES

FIELD

This disclosure relates generally to Information Handling Systems (IHSs), and more specifically, to systems and methods to detect data storage drive failures.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

One of the hardware components included in an IHS can be a data storage drive. However, data storage drives can be prone to failure. Failure of data storage drives can cause many problems, such as a loss of data stored on the data storage drive. Even if data is not lost because of an effective backup system, however, the time and expense of restoring a system from a backup is a cost in and of itself. In addition, even if data from a failed drive is restored from a backup, data might still be lost that was created from the time of the last backup until the time of the drive failure.

SUMMARY

Systems and methods to detect data storage drive failures are described. In an illustrative, non-limiting embodiment, an Information Handling System (IHS) may include: a processor; and a memory coupled to the processor, where the memory includes program instructions store thereon that, upon execution by the processor, cause the IHS to: obtain data attributes of a data storage drive within a system of data storage drives; generate, based at least in part on the data attributes of the data storage drive, engineered features related to the system of data storage drives; and generate, using a trained artificial intelligence or machine learning model, and based at least in part on the engineered features, a probability of failure for the data storage drive.

In some embodiments, the program instructions, upon execution by the processor, further cause the IHS to: determine to dispatch a replacement for the data storage drive, based at least in part on the probability of failure for the data storage drive. In some embodiments, the program instructions, upon execution by the processor, further cause the IHS to: derive a risk profile for the system of data storage drives.

In some embodiments, the program instructions, upon execution by the processor, further cause the IHS to: determine a risk score for the data storage drive based, at least in part, on the risk profile for the system of data storage drives. In some of these embodiments, the program instructions, upon execution by the processor, further cause the IHS to: determine that the data storage drive should be replaced based, at least in part, on the probability of failure for the data storage drive and the risk profile for the system of data storage drives. In some embodiments, the risk profile includes a bathtub curve risk profile that represents a failure rate for the system of data storage drives.

In some embodiments, the program instructions, upon execution by the processor, further cause the IHS to: determine a threshold probability of failure for the data storage drive based, at least in part, on the risk profile for the system of data storage drives; determine that the probability of failure for the data storage drive is greater than the threshold probability of failure for the data storage drive; and determine to replace the data storage drive based, at least in part, on probability of failure for the data storage drive being greater than the threshold probability of failure.

In some embodiments, the program instructions, upon execution by the processor, further cause the IHS to: determine a threshold probability of failure for the data storage drive based, at least in part, on the risk profile for the system of data storage drives; determine that the probability of failure for the data storage drive is less than the threshold probability of failure for the data storage drive; and determine to not replace the data storage drive based, at least in part, on probability of failure being less than the threshold probability of failure.

In some embodiments, the trained artificial intelligence or machine learning model includes a trained data storage drive failure prediction machine learning model. In some embodiments, the data storage drive is a hard disk drive, and where the system of data storage drives includes a plurality of hard disk drives within a same chassis or rack.

In some embodiments, the engineered features related to the system of data storage drives includes at least one of: (1) an operational time average of the data storage drives in the system; (2) a number of data storage drive failures in the system over a life span; (3) a number of data storage drive failures in the system during a first year of operation; (4) a number of data storage drive failures in the system after five years of service; (5) a number of data storage drive failures in the system between one year and five years of service; (6) a number of data storage drive failures in the system in a previous 7 days; (7) a number of data storage drive failures in the system in a previous 30 days; (8) a number of data storage drive failures in the system in a previous 60 days; (9) a number of data storage drive failures in the system in a previous 90 days; (10) a number of data storage drive failures in the system in a previous 120 days; (11) a number of data storage drive failures in the system in a previous 180 days; (12) a standard deviation of disk capacity used for each data storage drive in the system of data storage drives; or (13) a standard deviation of disk capacity used for all data storage drives in the system of data storage drives.

In some embodiments, the data attributes of the data storage drive includes at least one of: (1) at least some Self-Monitoring, Analysis, and Reporting Technology ("SMART") data; (2) disk error logs; or (3) disk utilization data.

In another illustrative, non-limiting embodiment, a method includes: generating, using a trained artificial intelligence or machine learning model, a probability of failure for a data storage drive of a plurality of data storage drives; deriving a risk profile for the plurality of data storage drives; and determining a replacement need for the data storage drive based, at least in part, on the probability of failure for the data storage drive and the risk profile for the plurality of data storage drives.

In some embodiments, the method further includes: obtaining data attributes of the data storage drive; generating, based at least in part on the data attributes of the data storage drive, engineered features related to the plurality of data storage drives; and where generating the probability of failure for the data storage drive further includes: generating, using the trained artificial intelligence or machine learning model, and based at least in part on the engineered features, the probability of failure for the data storage drive.

In some embodiments, the engineered features related to the plurality of data storage drives includes at least one of: (1) an operational time average of the data storage drives in the system; (2) a number of data storage drive failures in the system over a life span; (3) a number of data storage drive failures in the system during a first year of operation; (4) a number of data storage drive failures in the system after five years of service; (5) a number of data storage drive failures in the system between one year and five years of service; (6) a number of data storage drive failures in the system in a previous 7 days; (7) a number of data storage drive failures in the system in a previous 30 days; (8) a number of data storage drive failures in the system in a previous 60 days; (9) a number of data storage drive failures in the system in a previous 90 days; (10) a number of data storage drive failures in the system in a previous 120 days; (11) a number of data storage drive failures in the system in a previous 180 days; (12) a standard deviation of disk capacity used for each data storage drive in the system of data storage drives; or (13) a standard deviation of disk capacity used for all data storage drives in the system of data storage drives. In some embodiments, the risk profile includes a bathtub curve risk profile that represents a failure rate for the plurality of data storage drives.

In another illustrative, non-limiting embodiment, one or more non-transitory computer-readable storage media storing program instructions, that when executed on or across one or more processors, cause the one or more processors to: generate, using a trained artificial intelligence or machine learning model, a probability of failure for a first data storage drive of a system of data storage drives; derive a risk profile for the system of data storage drives; and determine a replacement need for a second data storage drive based, at least in part, on the probability of failure for the first data storage drive and the risk profile for the system of data storage drives.

In some embodiments, the program instructions further cause the one or more processors to: obtain data attributes of the first data storage drive; generate, based at least in part on the data attributes of the first data storage drive, engineered features related to the system of data storage drives; and where to generate the probability of failure for the data storage drive, the program instructions further cause the one or more processors to: generate, using the trained artificial intelligence or machine learning model, and based at least in part on the engineered features, the probability of failure for the first data storage drive.

In some embodiments, the engineered features related to the system of data storage drives includes at least one of: (1) an operational time average of the data storage drives in the system; (2) a number of data storage drive failures in the system over a life span; (3) a number of data storage drive failures in the system during a first year of operation; (4) a number of data storage drive failures in the system after five years of service; (5) a number of data storage drive failures in the system between one year and five years of service; (6) a number of data storage drive failures in the system in a previous 7 days; (7) a number of data storage drive failures in the system in a previous 30 days; (8) a number of data storage drive failures in the system in a previous 60 days; (9) a number of data storage drive failures in the system in a previous 90 days; (10) a number of data storage drive failures in the system in a previous 120 days; (11) a number of data storage drive failures in the system in a previous 180 days; (12) a standard deviation of disk capacity used for each data storage drive in the system of data storage drives; or (13) a standard deviation of disk capacity used for all data storage drives in the system of data storage drives. In some embodiments, the risk profile includes a bathtub curve risk profile that represents a failure rate for the system of data storage drives.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a chart depicting engineered features that can be generated using historical data, for detecting data storage drive failures, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
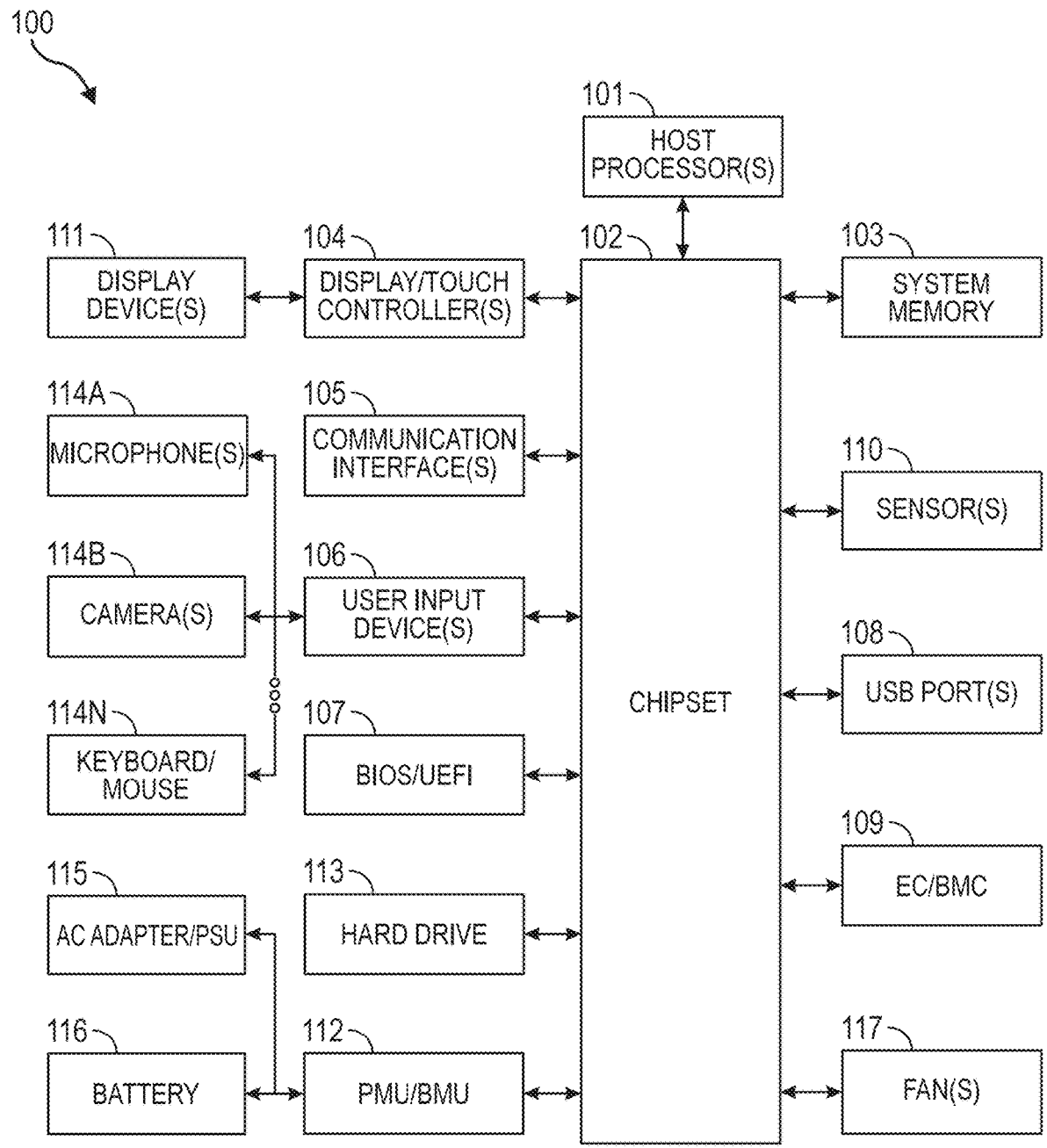
FIG. 1 is a diagram illustrating examples of hardware components of an Information Handling System (IHS), according to some embodiments.

FIG. 1 is a block diagram of hardware components of IHS 100, which may be used to implement the systems and methods to detect data storage drive failures.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
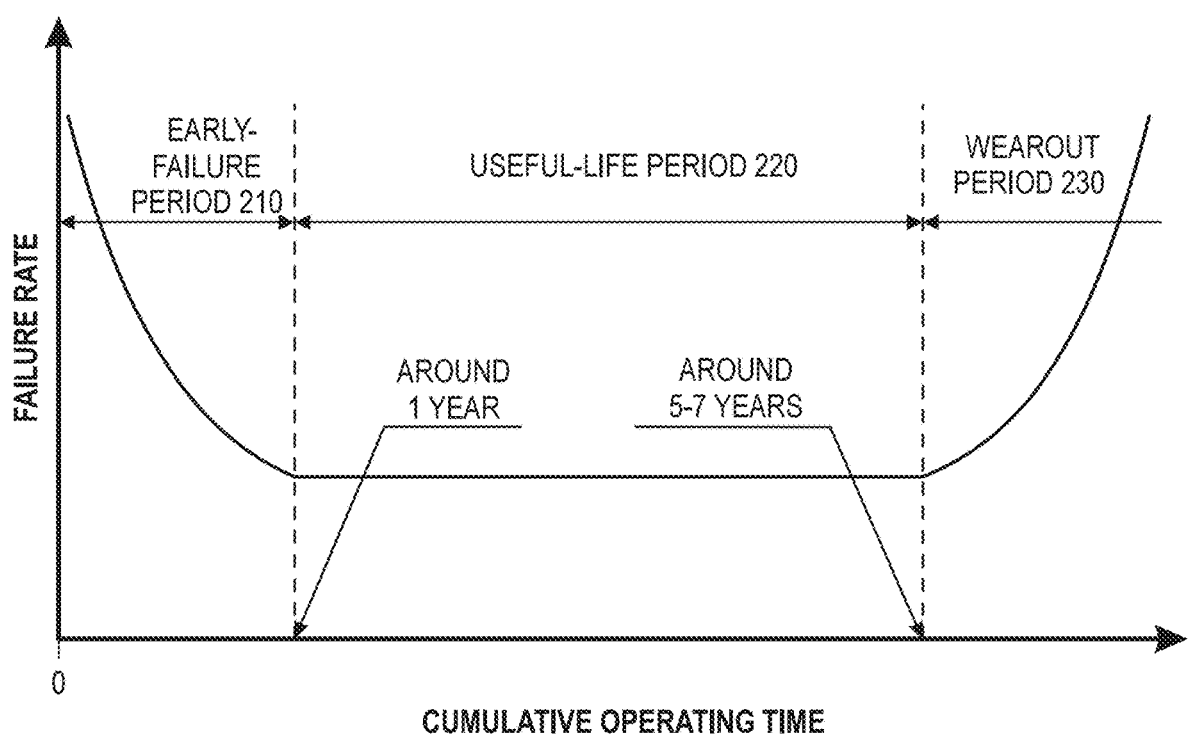
FIG. 2 is a diagram of a data storage drive failure curve that represents a failure rate for a population of data storage drives over time, according to some embodiments.

FIG. 2 is a diagram of a data storage drive failure curve that represents a failure rate for a population of data storage drives over time, according to some embodiments. In some embodiments, the data storage drives can be hard disk drives, solid-state drives, optical drives, and/or other removable-media drives 113 of an IHS 100.

The hard disk failure curve of FIG. 2 represents the failure rate for a population of hard disks over time. The curve can be used to predict the probability of a hard disk failure within a specific time period. As shown in FIG. 2, the curve typically follows a bathtub shape, with a high rate of failures in the early stages of the disk's life (early-failure period 210), a low rate of failures during the middle of the disk's life (useful life period 220), and a rising rate of failures towards the end of the disk's life (wearout period 230).

Hard-disk manufacturers, IHS manufacturers, and/or data center administrators can monitor a metric called Repeat Dispatch Rate ("RDR") for data storage drives. RDR can measure how often a second replacement data storage drive needs to be sent to a customer within a certain time period after first replacement data storage drive was sent to a customer. In some embodiments, one of the largest contributors to RDR is data storage drive failures within 7 days of another data storage drive failure in the same server. Repeat data storage drive failures on the same server can cause a lot of additional cost for the manufacturer and/or the customer. If the drive and/or IHS manufacturer were able to predict that a second data storage drive is close to failing after a first data storage drive has been reported as failed, and dispatch both data storage drives at the same time, then this could save time, increase efficiency, and provide for a better customer experience.

Consequently, the hard disk failure curve of FIG. 2 can be a tool for hard-disk manufacturers, IHS manufacturers, and/or data center administrators, as it can be used to make informed decisions about disk replacements and maintenance, in some embodiments. For example, suppose the curve indicates that a high percentage of disks are likely to fail within a specific time period. In that case, a hard-disk manufacturer, IHS manufacturer, and/or data center administrator can proactively replace those disks before they fail, reducing the risk of downtime and data loss.

It's important to note that the hard disk failure curve is not absolute and can vary based on several factors, including disk manufacturer, model, usage, and environmental conditions. Therefore, disk health and performance can be regularly monitored, and the failure curve can be updated accordingly, in some embodiments.

Figure 3:
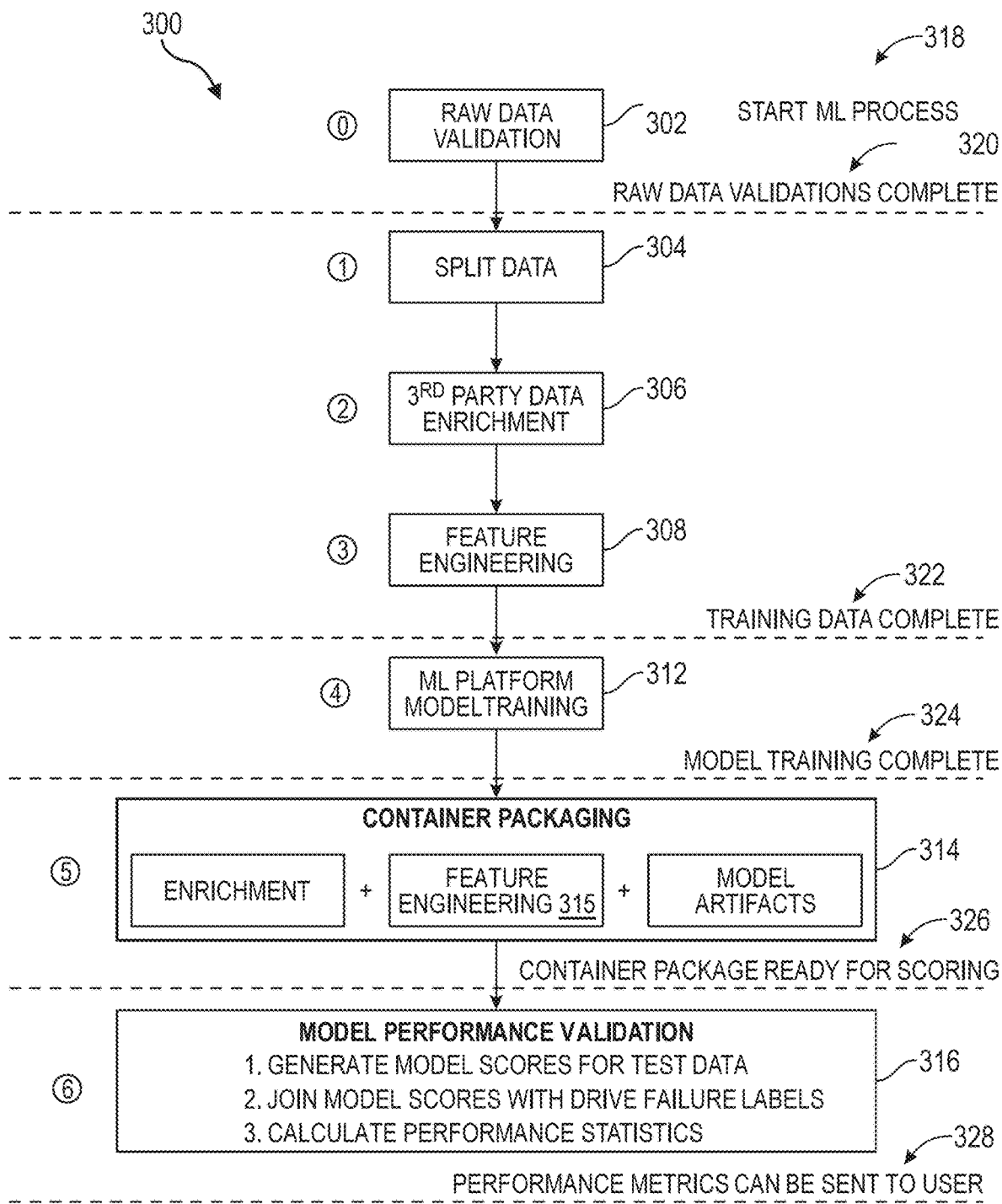
FIG. 3 is a flow diagram depicting a machine learning process for the training, generation, and validation of an artificial intelligence or machine learning model for detecting data storage drive failures, according to some embodiments.

FIG. 3 is a flow diagram depicting a machine learning process for the training, generation, and validation of an artificial intelligence or machine learning ("ML") model for detecting data storage drive failures, according to some embodiments. The result of FIG. 3 can be a trained and validated data storage drive failure prediction ML model, in some embodiments.

As will be detailed in later figures, a trained artificial intelligence or machine learning model of FIG. 3 can be combined with the data storage drive failure curve of FIG. 2 to predict multiple hard disk failures in a data center. Predicting multiple hard disk failures in a data center can have significant benefits for hard-disk manufacturers, IHS manufacturers, and/or data center administrators, including but not limited to some or all of the following: (1) Reduced operational costs: Multiple hard disks can be dispatched, saving shipping and installation costs; (2) Improved uptime: Businesses can minimize the risk of downtime and data loss by predicting and proactively replacing failed disks; (3) Cost savings: Predicting and replacing disks before they fail can be less expensive than dealing with the consequences of a failure, such as lost data or prolonged downtime; (4) Better data protection: Businesses can ensure that their data is always safe and secure by predicting and preventing hard disk failures; (5) Improved resource allocation: By predicting which disks are most likely to fail, businesses can allocate resources more efficiently and prioritize replacements accordingly; (6) Better decision-making: Predictive analytics algorithms can provide valuable insights into disk performance, enabling better decision-making about hardware upgrades, maintenance schedules, and more; and (7) Predicting hard disk failures in a data center can help businesses ensure their IT systems' stability, reliability, and efficiency, which is critical for supporting their operations and achieving their goals.

Returning to FIG. 3, FIG. 3 illustrates an example machine learning model generation pipeline ("MLMGP") 300, where the pipeline first validates the raw data 302, then splits the data 304, then enriches the data with 3rd party data 306, then feature engineers or transforms the data 308, then performs a machine learning model training 312, possibly including hyper-parameter optimization, then packages containers into a generated machine learning executable package 314, before validating model performance 316 of the executable package by generating model scores for test data and calculating performance statistics, according to some embodiments.

At the beginning, the process is started 318, and after the raw data validation step 302, the raw data validations are complete 320. After the feature engineering step 308, then the training data is complete 322. After the ML platform model training 312, then the model training is complete 324. After the container packaging 314, then the container package is ready for scoring 326. After the model performance validation 316, then the performance metrics can be sent to the client 328.

To ensure that any data input to MLMGP is a) of good quality, b) has sufficient number of samples and c) contains a data schema is properly configured, MLMGP can, in a first step, validate 302 data before initiating the ML pipeline, in some embodiments. Validations, in some embodiments, can ensure that uploaded data meets the requirements to build a performance model. An effective validation scheme can be a pre-requisite for the MLMGP, in some embodiments. One of the objectives of raw data validation, in some embodiments, is to identify potential issues in data or configuration errors as early as possible so that actions can be taken before wasting time in training a model that would not perform well. For example, some common errors might be mapping the wrong column to the wrong label or specifying the wrong variable types.

MLMGP can employ, in some embodiments, a set of heuristic requirements to be fulfilled in raw data before the data can successfully train a good model. The requirements might include 1) minimum requirement on total, failure, and non-failure events, 2) undefined/missing label values, 3) instability of failure rate over time, 4) email and IP addresses adhering the expected regular expressions for email and IP addresses, 5) percentage of missing values, and 6) uniqueness of the categorical features. MLMGP can provide, in some embodiments, concise messages to help users understand potential issues in their data within a short delay, in some embodiments.

To predict hard disk failures, some or all of the following types of data can be input in the MLMGP, in some embodiments: (1) SMART data: Self-Monitoring, Analysis, and Reporting Technology ("SMART") data provides information about the health and performance of a hard disk. SMART data includes attributes such as disk temperature, spin-up time, number of reallocated sectors, and more. There can be more than 200 SMART attributes, in some embodiments. (2) Disk error logs: Error logs can provide information about disk read/write errors, disk-related issues, and other failures. (3) Disk utilization: Monitoring disk utilization over time can help predict when a disk is likely to fail, as high utilization can indicate disk wear and tear.

In some embodiments, the following system and disk attributes might also be used as inputs for the MLMGP as well. However, in other embodiments, some or all of these system and disk attributes might be derived in step 306, using $3^{rd}$ party data enrichment, depending on the embodiment. Some of the system and disk attributes can be: (1) data storage disk capacity; (2) the number of data storage disks per system; (3) the current age of the system; (4) data storage disk density (e.g., the amount of data stored on a hard disk, typically measured in bits per square inch. Higher-density hard disks can store more data in the same physical space as lower-density disks, making them more efficient for storage); (5) CPU utilization; and/or (6) customer install base and its data storage disk composition.

After the data passes all validation tests, the MLMGP can split the data 304, in some embodiments. MLMGP might split the data into 3 segments, in some of these embodiments. For example, these 3 segments can be a training set, a validation set and a testing set. The training set can comprise around 70% of the data, the validation set can comprise 15% of the data, and the testing set can comprise the remaining 15%, in some embodiments. The split can be based on the event timestamp of the data, in some of these embodiments. A training set can be used to train the supervised algorithm, in some embodiments. A validation set can be used for hyper-parameter optimization, in some embodiments. The test set, might be thought of as holdout data, and might be used for estimation of model performance, in some embodiments. This estimation of model performance might estimate the model's performance on other, future unseen data. This estimation of model performance can be provided back to the user, in some embodiments.

One rationale behind this out-of-time ("OOT") splitting strategy based on event timestamps, which occurs in some embodiments, is to ensure that the model performance estimates are as realistic and unbiased as possible, with respect to the performance of the model after model deployment. It can be common that failure patterns change over time. For example, both data storage drive failure rates and data distributions can vary over time. In other words, the OOT splitting strategy based on event timestamps might ensure that any performance estimates take into account the fact that relationships that existed in past may not exist in future, so that the deployed model does not perform worse than any estimates. In some embodiments, MLMGP maintains fixed split ratios of 70:15:15 for the train/validation/test segments respectively.

MLMGP can integrate 3rd party tables into its pipeline in 3rd party data enrichment 306, in some embodiments. In the drive failure detection and prevention space, there might be a large number of categorical features and very few numeric variables, in some embodiments. Some categorical data elements are very useful for identifying failure patterns, but have very high cardinality, in some of these embodiments. For example, an IP address for a given event can point towards a location of the actor, but the cardinality of this feature can be of the order of 109. Simply injecting those variables into models will probably not work, and instead likely can result in overfitting.

As a solution to these and other problems, MLMGP can integrate 3rd party tables into its pipeline, in some embodiments. MLMGP can enrich at least one of the data elements with a high cardinality with one or more additional data elements comprising a lower cardinality or with data elements comprising numerical or continuous variables, from an external data source, in some embodiments. This can allow the system, for example, to look up a specific IP address, customer number, data center identification number, server type, model number, etc., and retrieve multiple additional attributes.

For example, 3rd party data enrichment might enrich a data storage drive model number with additional features such as the data storage drive capacity, and the data storage drive density. As another example, 3rd party data enrichment might enrich an IHS or system identification number with the number of data storage disks in the system, and/or the current age of the system. As another example, 3rd party data enrichment might enrich a customer number with the customer's IHS install base and/or its data storage disk composition.

As another example, IP address enrichment can result in over 20 additional features describing the geolocation of the IP address, such as for example, autonomous system number ("ASN"), country, latitude, longitude, and/or ISP, etc. MLMGP can enrich at least one of the data elements with a high cardinality with one or more additional data elements comprising a lower cardinality or with data elements comprising numerical or continuous variables, from the 3rd party tables, in some embodiments. In some embodiments, ML solutions without these enrichments might not work properly with failure datasets. In some embodiments, MLMGP might only enrich IP numbers, based on a data schema provided by a user. In other embodiments, MLMGP can enrich other variables that are known to be important for failure prevention, such as, for example, customer number, data center identification number, IHS or server identification number, drive model number, etc.

After a potential $3^{rd}$ party data enrichment step 306, MLMGP can proceed to a feature engineering 308 mechanism. In some embodiments, clients or users can define variable types for each column in their CSV file before initiating model training. For individual variable types, whether in columns of a CSV file or in another format, in some embodiments, MLMGP can define a set of data cleaning and transformations steps (feature engineering 308), such as in a global configuration file for example.

Data cleaning and feature engineering can be critical steps in a process of artificial intelligence or machine learning model generation. Failure to properly handle data can result in under-performing models or even complete training failure, in some embodiments. MLMGP, in some embodiments, allows users to upload customized datasets. In some embodiments, MLMGP might only require a limited number of known variables for operation. In some embodiments, MLMGP might only require few known variables such: SMART data, event timestamp, IHS or system identification number, drive type, drive manufacturer, drive model number, in-service date of storage drive, and/or a label for each event. However, without further innovations, an ML model might not learn complex failure patterns to achieve a high accuracy.

Therefore, some embodiments of the present disclosure can implement feature engineering 308 related to hard disk topology within a system. FIG. 4 is a chart (400) depicting engineered features that can be generated using historical data, for detecting data storage drive failures, according to some embodiments. For example, the feature engineering mechanism 308 can derive these engineered features from the raw data input into the system that was validated in step 302, and/or from the enriched data created in the $3^{rd}$ party data enrichment step 306 of the MLMGP, depending on the embodiment. As shown in FIG. 4, the data is transformed in a unique and novel way to generate additional features to help the data storage drive failure prediction ML Model learn highly complex failure patterns. Predicting the failure of a data storage drive at an earlier stage can be essential to prevent the computer system from crashing, as the failure is often quick.

Some of the engineered features are listed in 400 of FIG. 4, according to some embodiments. These features can be generated using historical data, in some embodiments. These can be one or more of the following: (1) The operational time average of all disks in a single system. This can refer to the age of each disk since it is put into operation and the average of all the disks in a given system. (2) The number of disk failures in a given system over a life span. (3) The number of disk failures in a given system in the first year of operation. This can make the data storage drive failure prediction ML model learn the bathtub characteristics of early failure. (4) The number of disk failures in a given system after five years of service. This can make the data storage drive failure prediction ML model learn the bathtub characteristics of late failure. (5) The number of disk failures in a given system between one year and five years of service. This can make the data storage drive failure prediction ML model learn the bathtub characteristics of longer mid-phase. (6) The number of disk failures in a given system in the last 7 days. (7) The number of disk failures in a given system in the last 30 days. (8) The number of disk failures in a given system in the last 60 days. (9) The number of disk failures in a given system in the last 90 days. (10) The number of disk failures in a given system in the last 120 days. (11) The number of disk failures in a given system in the last 180 days. (12) The standard deviation of disk capacity used for each disk in a system (e.g., daily and/or weekly interval data). (13) The standard deviation of disk capacity used for all disks in a system (e.g., daily and/or weekly interval data).

In addition, MLMGP can also, in some embodiments, use the concept of variable types. In some embodiments, users can define variable types for each column in their CSV file before initiating model training. For individual variable types, in some embodiments, MLMGP can define a set of data cleaning and transformations steps (transformers) in a global configuration file. In some embodiments, at runtime, during the feature engineering step 308, MLMGP can check which variable types are present in the data, and the workflow can generate a customized transformation recipe, in some of these embodiments.

More generally, feature engineering 308 can transform raw data in preparation for model training. For example, if dataset contains an "email_address" column and a user indicates it is of type EMAIL, then based on global configuration file MLMGP might know that it needs to first replace missing values with handle@domain.com, and then split that column into two columns, handle and domain, based on a pre-defined regular expression. Other examples are one hot encoding, hashing, and string manipulation.

In a next step, in some embodiments, MLMGP can use a custom recipe to build a custom Feature Engineering object 315, in some embodiments. A custom Feature Engineering object 315 can be a conglomerate of many engineered features, such that the object is able to handle a custom dataset of the user, in some embodiments. The Feature Engineering object 315 might be fitted on training data, in some embodiments, since some engineered features need to learn their parameters. For example, missing values in numeric columns might need to be replaced with a mean value, and the Feature Engineering object 315 might learn that mean during some type of training. A fitted Feature Engineering object 315 can be saved as an artifact by MLMGP, in some embodiments, and can be used during inference to apply correct transformations to client or user data.

The ML model training system can then train a artificial intelligence or machine learning model 312 using at least some of the data points of the enriched and transformed dataset, in some embodiments. The ML platform model training can perform model training using training data.

Many common implementations of ML algorithms, such as random forest, XGBoost, and neural networks, do not handle categorical features directly and require pre-processing of categorical features into numerical values (e.g., one-hot-encoding, embedding, and target encoding). However, the vast majority of data for storage disk failure detection and prevention, for example, can be categorical variables such as enrichment features from IP addresses (e.g., IP city), and model numbers (e.g., manufacturer names), as well as information related to billing or shipping (e.g., names and postal code). It is not uncommon that many of the categorical variables have a cardinality in the order of thousands or even tens of thousands. In some embodiments, the MLMGP can gracefully deal with categorical features without cumbersome pre-processing. The MLMGP can directly handle categorical features by using an ordered target statistic to minimize the impact of target leakage. In some embodiments, MLMGP can consistently outperform other options by up to 2 base points in term of area under the receiver operating characteristic curve ("AUC"), often with minimal hyperparameter tuning. In addition, the inference speed can be an order of magnitude faster than both random forest and XGBoost, in some embodiments.

In some of these embodiments of MLMGP, hyper-parameter optimization ("HPO") can be used during model training to determine the best performing model. For example, HPO can be run during model training to minimize the chance that default hyper-parameters may not be optimal for a specific data set. MLMGP can also use the area under the receiver operating characteristic curve ("AUC") metric on a separate out-of-time validation data set as the optimization metric to tune the hyper-parameters, in some of these embodiments. This validation data set can be created by the splitting component 304, previous to the model training 312, in some embodiments.

Other metrics can also be used besides AUC, depending on the specific use cases. In addition, simple grid or random search can be very effective when the problem has narrow search space and small data set, in some embodiments. However, finding the optimal solution in a high-dimensional space with both categorical and continuous hyper-parameters and hierarchical dependencies via simple grid or random search is not always the fastest or even feasible with limited budget, especially for large data sets, in other embodiments. Instead of grid or random search, in which samples are taken independently regardless of the search histories, some embodiments of MLMGP can decide more intelligently which set of configurations to try next based on past samples (e.g., avoiding the expensive evaluation of unpromising configurations). MLMGP can employ sequential model-based optimization ("SMBO") as a Bayesian optimization framework for hyper-parameter optimization in ML, in some embodiments. SMBO can significantly improve the quality of the returned configurations, often in less time or trials, in some embodiments.

After training, in some embodiments, the containers (enrichment, feature engineering 315, and classification model) can be chained together into a pipeline 314 that is ready to be hosted in machine learning execution environment for real-time inference. For example, container packaging 314 can package containers from the 3rd party data enrichment step 306 and the feature engineering step 308, and model artifacts from the ML platform model training step 312, so that all steps can be performed together during inference. In other embodiments, this container packaging step 314 can be skipped, and the trained artificial intelligence or machine learning model can be validated directly in step 316. The pipeline can take in the raw variables and produce risk scores using all the artifacts generated during training, in some embodiments.

The ML pipeline (or simply the trained data storage drive failure prediction ML model) can be validated 316, in some embodiments. The purpose of model performance validation 316, in some embodiments, is to use a separate out-of-time test data set (e.g., that was created by the splitting component 304) to estimate the overall performance of the trained pipeline (including enrichment, transformation, and classification) on future data. This test data set can be created by the splitting component 304 previous to the model performance validation 316, in some embodiments. By the use of a separate out-of-time test data set, the model performance validation 316 can produce unbiased estimates of model performance that minimize the proximities of being either overly optimistic or overly pessimistic, in some embodiments.

The performance metrics of the model can be reported back to the users in terms of AUC and receiver operating characteristic ("ROC") curves, in some embodiments. For example, the model performance validation step 316 can produce model performance metrics like confusion matrices, fake positives, true positives, and/or precision. Based on the reported performance metrics, a user can determine if the model's performance meets their needs. If the user chooses to go forward with the model, the user might also choose an appropriate threshold on predicted risk scores to trigger actions (e.g., decline, investigate, and pass), in some embodiments.

Figures 5A, 5B:
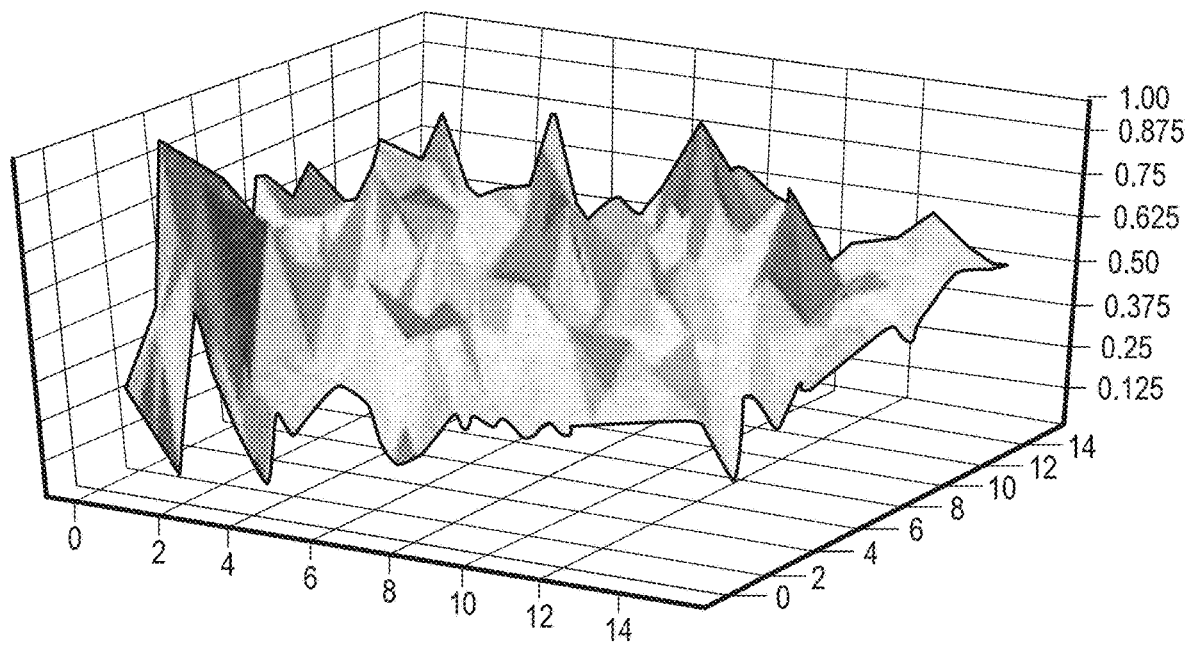
FIG. 5A is a graph of an example probability of failure of a data storage drive, output by an example data storage drive failure prediction artificial intelligence or machine learning model, as mapped to two input features, according to some embodiments.
FIG. 5B is a chart depicting an example probability of failure output of an example data storage drive failure prediction artificial intelligence or machine learning model, according to some embodiments.

FIG. 5A is a graph (500A) of an example probability of failure of a data storage drive, output by an example data storage drive failure prediction artificial intelligence or machine learning model, as mapped to 2 input features, according to some embodiments. In some embodiments, the data storage drives can be hard disk drives, solid-state drives, optical drives, and/or other removable-media drives 113 of an IHS 100. In some embodiments, the graph 500A of FIG. 5A was output by the model performance validation step 316, using a separate out-of-time test data set (e.g., that was created by the splitting component 304) to estimate the overall performance of the trained pipeline (including enrichment, transformation, and classification) on future data. The 3-dimensional graph 500A of FIG. 5A shows the probability of failure of a data storage drive, which is output by the trained data storage drive failure prediction ML model, versus 2 different data inputs to the data storage drive failure prediction ML model. The two data inputs are shown as the 2 horizontal axis that form a horizontal plane in the bottom of the graph, with each axis having values ranging from 0 to 14. The probability of failure output of the data storage drive failure prediction ML model is shown as the vertical axis of the 3-dimensional graph, with values ranging from 0 to 1.00 as shown.

The two inputs shown in the graph 500A of FIG. 5A can be, for example, the operational time average of all disks in a single system as the first input to the trained data storage drive failure prediction ML model, and the hard disk capacity as the second input to the data storage drive failure prediction ML model. Of course, there might be many other inputs to the trained data storage drive failure prediction ML model, depending on the embodiment. However, generating a graph that maps all the inputs to the probability of failure of a data storage drive output would take more dimensions that we have to visualize such a graph. Therefore, the graph of FIG. 5A is a mere example that is intended to depict the variability of the probability of failure of a data storage drive output as at least two of the inputs to the data storage drive failure prediction ML model are changed, according to some embodiments.

FIG. 5B is a chart 500B depicting an example probability of failure output of an example data storage drive failure prediction artificial intelligence or machine learning model, according to some embodiments. In some embodiments, the data storage drives can be hard disk drives, solid-state drives, optical drives, and/or other removable-media drives 113 of an IHS 100. The chart 500B of FIG. 5B shows the results of the trained data storage drive failure prediction ML model when run 7 different times for 7 different data storage drives of a single system, according to some embodiments. A system can encompass a plurality of data storage drives that are all associated with a single IHS, or contained with the same chassis, or contained within the same rack of a datacenter, depending on the embodiment.

For each of the drives of a system (identified by drive identifier 1-7 in the left-hand column of the chart) raw data regarding the drives was input to the model, in some embodiments. For example, some or all of the following types of data could be input to the model, in some embodiments: (1) SMART data: Self-Monitoring, Analysis, and Reporting Technology ("SMART") data providing information about the health and performance of a data storage drive. SMART data includes attributes such as drive temperature, spin-up time, number of reallocated sectors, and more. It can also include the model number of the data storage drive. There can be more than 200 SMART attributes, in some embodiments. (2) Drive error logs: Error logs can provide information about drive read/write errors, drive-related issues, and other failures. (3) Drive utilization: Monitoring disk utilization over time can help predict when a drive is likely to fail, as high utilization can indicate disk wear and tear.

In addition, the following system and drive attributes might also be used as inputs for the model as well. However, in other embodiments, some or all of these system and drive attributes might be derived using $3^{rd}$ party data enrichment (like step 306 of FIG. 3), depending on the embodiment. Some of the system and disk attributes can be: (1) data storage drive capacity; (2) the number of data storage drives per system; (3) the current age of the system; (4) data storage drive density; (5) CPU utilization; and/or (6) customer number, customer install base, and/or its data storage drive composition.

The raw data input to the model can then be validated, in some embodiments, similar to step 302 of FIG. 3. The data can then be enriched, such as with $3^{rd}$ party data, similar to stop 306 of FIG. 3. Feature engineering can then be performed on the data, in some embodiments, similar to step 308 of FIG. 3. The validated, enriched, and feature engineered data regarding each of the 7 data storage drives in the system of FIG. 5B can then be provided to the trained data storage drive failure prediction ML model to provide the outputs seen in the $2^{nd}$ and $3^{rd}$ columns of the chart in FIG. 5B.

The $2^{nd}$ and $3^{rd}$ columns of the chart in FIG. 5B depict the output of the trained data storage drive failure prediction ML model for each of the drives of a system (identified by drive identifier 1-7 in the left-hand column of the chart). In some embodiments, the trained data storage drive failure prediction ML model might only output the "probability of failure" of the data storage drive, while a separate mechanism receives the probability of failure, and then outputs the "model prediction" for the drive based on whether the probability of failure is above or below a certain threshold. For example, if the probability of failure is at or above a threshold (such as ≥0.80) then the mechanism can output "FAILURE" for the "model prediction", whereas if the probability of failure is under the threshold (such as <0.80) then the mechanism can output "NORMAL" for the "model prediction." The "model prediction" is shown as the $2^{nd}$ column of the chart in FIG. 5B. In other embodiments, the trained data storage drive failure prediction ML model can output both the "probability of failure" of the data storage drive, and the "model prediction" for the drive.

Referring specifically to FIG. 5B, the chart 500B depicts that drive 1 has a normal prediction with a probability of failure of 0.12. Drive 2 has a normal prediction with a probability of failure of 0.41. Drive 3 has a normal prediction with a probability of failure of 0.23. Drive 4 has a prediction of a failure, with a probability of failure of 0.84. Drive 5 has a normal prediction with a probability of failure of 0.01. Drive 6 has a normal prediction with a probability of failure of 0.47. Finally, drive 7 has a normal prediction with a probability of failure of 0.21.

Figure 6:
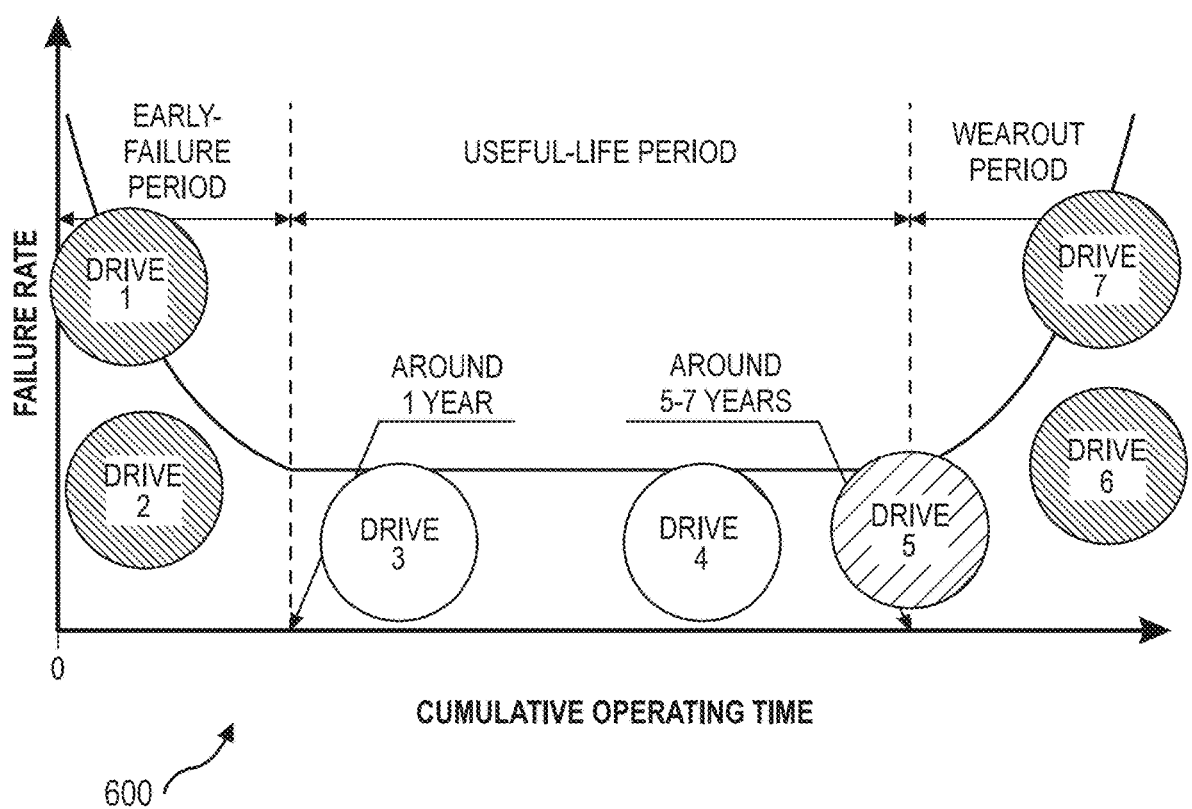
FIG. 6 is a diagram of a bathtub curve risk profile that represents a failure rate for a population of specific data storage drives of a specific system for detecting data storage drive failures, according to some embodiments.

FIG. 6 is a diagram 600 of a bathtub curve risk profile that represents a failure rate for a population of specific data storage drives of a specific system, for detecting data storage drive failures, according to some embodiments. In some embodiments, the data storage drives can be hard disk drives, solid-state drives, optical drives, and/or other removable-media drives 113 of an IHS 100. In some embodiments, the 7 data storage drives mapped in the bathtub curve risk profile of FIG. 6 can be the same 7 data storage drives for which the trained data storage drive failure prediction ML model was run, and each of which received a probability of failure as shown in FIG. 5B. For each system consisting of multiple disks, a bathtub curve risk profile can be built, such as the one 600 depicted in FIG. 6. Then, a risk score can be assigned to each data storage drive, based on the data storage drive's location on the curve.

The bathtub curve risk profile 600 of FIG. 6 depicts that data storage drives 1, 2, 6, and 7 have a potential higher failure rate. Data storage drives 1 and 2 have a higher failure rate because their cumulative operating time puts them in the "early failure period." Data storage drives 6 and 7 have a higher failure rate because their cumulative operating time puts them within the "wearout period." Drives 3 and 4 have a lower failure rate than the other disks, because their cumulative operating time puts them in the "useful-life period" of data storage drive operation. Finally, drive 5 has a slightly higher failure rate than drives 3 and 4 because its cumulative operating time puts it in a borderline category between the "useful-life period" and the "wearout period."

Figure 7:
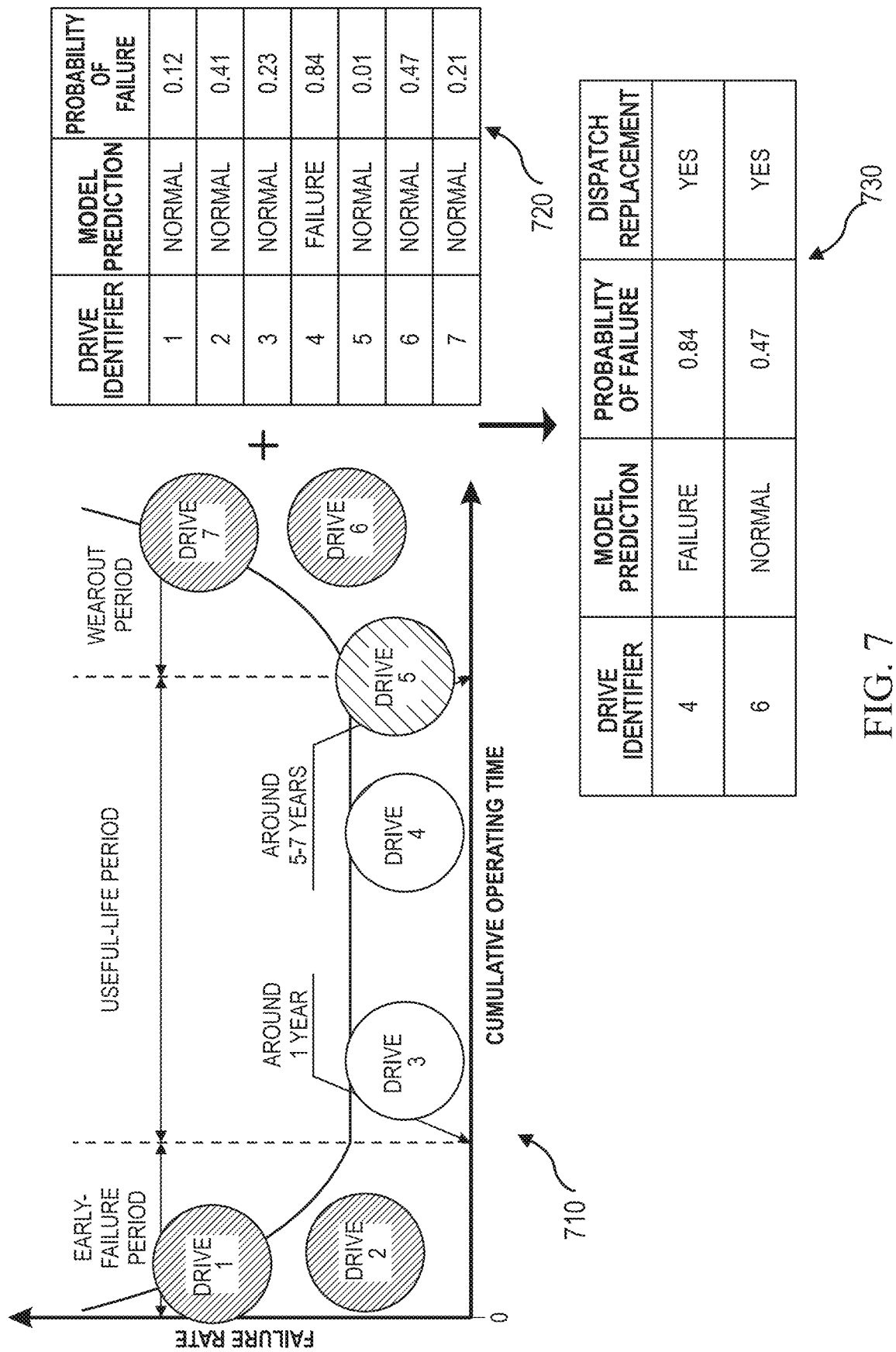
FIG. 7 is a diagram depicting a combining of a bathtub curve risk profile with the probability of failure output of an example data storage drive failure prediction artificial intelligence or machine learning model, according to some embodiments.

FIG. 7 is a diagram depicting a combining of a bathtub curve risk profile 710 with the probability of failure output 720 of an example data storage drive failure prediction artificial intelligence or machine learning model, according to some embodiments. FIG. 7 combines the bathtub curve insights 710 with a data storage drive failure prediction ML model, to produce a list of disks 730 to dispatch to a customer or client, according to some of these embodiments. FIG. 7 uses the bathtub curve, and the mapping of the data storage drives to the bathtub curve 710, and merges it with the outcome 720 of data storage drive failure prediction ML model prediction, according to some embodiments. As shown in FIG. 7, output 500B from a trained data storage drive failure prediction ML model of FIG. 5B can be combined with a bathtub curve risk profile 600 of FIG. 6 to predict multiple hard disk failures 730 in a specific system, and/or to determine which drives need to have a replacement dispatched.

As shown in the bathtub curve risk profile 710 of FIG. 7, data storage drives 1, 2, 6, and 7 have a potential higher failure rate. Data storage drives 1 and 2 have a higher failure rate because their cumulative operating time puts them in the "early failure period." Data storage drives 6 and 7 have a higher failure rate because their cumulative operating time puts them within the "wearout period." Drives 3 and 4 have a lower failure rate than the other disks, because their cumulative operating time puts them in the "useful-life period" of data storage drive operation. Finally, drive 5 has a slightly higher failure rate than drives 3 and 4 because its cumulative operating time puts it in a borderline category between the "useful-life period" and the "wearout period."

As shown in the data storage drive failure prediction ML model output 720 of FIG. 7, drive 1 has a normal prediction with a probability of failure of 0.12. Drive 2 has a normal prediction with a probability of failure of 0.41. Drive 3 has a normal prediction with a probability of failure of 0.23. Drive 4 has a prediction of a failure, with a probability of failure of 0.84. Drive 5 has a normal prediction with a probability of failure of 0.01. Drive 6 has a normal prediction with a probability of failure of 0.47. Finally, drive 7 has a normal prediction with a probability of failure of 0.21.

As shown in FIG. 7, the bathtub curve risk profile 710 can be combined with the data storage drive failure prediction ML model output 720 in order to determine data storage drives that are likely to fail 730, and therefore need a replacement to be dispatched. The data storage drive failure prediction ML model predicted that drive 4 would fail with a probability of failure of 0.84. Therefore, even though drive 4 is in the "useful-life period" of the bathtub curve risk profile, drive 4 is identified with a drive of a high probability of failure, and therefore determined to be a drive where a replacement should be dispatched. In addition, the data storage drive failure prediction ML model predicted that drive 6 had a probability of failure of 0.47. In the bathtub curve risk profile, data storage drive 6 has a higher failure rate because its cumulative operating time puts it within the "wearout period." Combining the bathtub curve risk profile with the data storage drive failure prediction ML model output, drive 6 can be determined to be a drive where a replacement should be dispatched. This is because, in some embodiments, drive 6 can have a probability of failure that is higher than a threshold probability of failure for a drive that is in the "wearout period" of the bathtub curve risk profile.

Therefore, in some embodiments, predictions can be made regarding whether replacement data storage drives should be dispatched based, at least in part, on whether a predicted probability of failure (from a data storage drive failure prediction ML model) is greater than (or greater than or equal to) a threshold probability of failure for data storage drives that are in the "wearout period" of the bathtub curve risk profile. In addition, in some embodiments, predictions can be made regarding whether replacement data storage drives should be dispatched based, at least in part, on whether a predicted probability of failure (from a data storage drive failure prediction ML model) is greater than (or greater than or equal to) a threshold probability of failure for data storage drives that are in the "early failure period" of the bathtub curve risk profile.

In other embodiments, each time frame of a data storage drive (e.g., each year of cumulative operating time of the data storage drive) can have a threshold probability of failure associated with it, such that data storage drives that are within a time frame, and have a predicted probability of failure greater than (or greater than or equal to) the threshold probability of failure associated with that time frame, would have a replacement data storage drive dispatched. Therefore, for example, each year of cumulative operating time of a data storage drive might have a threshold probability of failure associated with it. The threshold probability of failure can be determined, in some embodiments, based on the bathtub curve risk profile.

In order to determine whether a data storage drive should be replaced, and/or whether a replacement should be dispatched, the cumulative operating time of the drive can be determined, in some embodiments. Then, the threshold probability of failure associated with that cumulative operating time of the drive can be determined. In addition, a predicted probability of failure of the data storage drive can also be determined by a data storage drive failure prediction ML model. The predicted probability of failure of the data storage drive can then be compared to the threshold probability of failure to determine whether the predicted probability of failure is greater than (or greater than or equal to) the threshold probability of failure. If the predicted probability of failure of the data storage drive is greater than (or greater than or equal to) the threshold probability of failure, then it can be determined that the data storage drive is likely to fail, and/or the data storage drive should be replaced, and/or a replacement for the data storage drive should be dispatched.

Predicting whether replacements should be dispatched for data storage drives in a data center can have significant benefits for hard-disk manufacturers, IHS manufacturers, and/or data center administrators, including but not limited to some or all of the following: (1) Reduced operational costs: Multiple hard disks can be dispatched, saving shipping and installation costs; (2) Improved uptime: Businesses can minimize the risk of downtime and data loss by predicting and proactively replacing failed disks; (3) Cost savings: Predicting and replacing disks before they fail can be less expensive than dealing with the consequences of a failure, such as lost data or prolonged downtime; (4) Better data protection: Businesses can ensure that their data is always safe and secure by predicting and preventing hard disk failures; (5) Improved resource allocation: By predicting which disks are most likely to fail, businesses can allocate resources more efficiently and prioritize replacements accordingly; (6) Better decision-making: Predictive analytics algorithms can provide valuable insights into disk performance, enabling better decision-making about hardware upgrades, maintenance schedules, and more; and (7) Predicting hard disk failures in a data center can help businesses ensure their IT systems' stability, reliability, and efficiency, which is critical for supporting their operations and achieving their goals.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions stored thereon that, upon execution by the processor, cause the IHS to:
obtain data attributes comprising sensor data from each data storage drive of a plurality of data storage drives within a system of data storage drives;
generate, based at least in part on the data attributes of the plurality of data storage drives, engineered features related to the system of data storage drives;
generate, using an artificial intelligence or machine learning model trained with training data comprising sensor data captured from a reference population of data storage drives, and based at least in part on the engineered features related to the system of data storage drives, a probability of failure for each data storage drive of the plurality of data storage drives within the system;
in response to a determination that at least one data storage drive of the plurality of data storage drives within the system is at least one failed data storage drive, determine a probability of failure for each operational data storage drive of the plurality of data storage drives within the system, by the artificial intelligence or machine learning model based on live real-time sensor data from the plurality of data storage drives; and
in response to a determination that the probability of failure for at least one operational data storage drive is greater than a threshold probability of failure, dispatch a replacement for the at least one failed data storage drive and the at least one operational data storage drive.

2. The IHS of claim 1, wherein the program instructions, upon execution by the processor, further cause the IHS to:
determine to dispatch a replacement for the plurality of data storage drives, based at least in part on the probability of failure for a plurality of operational data storage drives.

3. The IHS of claim 1, wherein the program instructions, upon execution by the processor, further cause the IHS to:
derive a risk profile for the system of data storage drives.

4. The IHS of claim 3, wherein the program instructions, upon execution by the processor, further cause the IHS to:
determine a risk score for the plurality of data storage drives based, at least in part, on the risk profile for the system of data storage drives.

5. The IHS of claim 3, wherein the program instructions, upon execution by the processor, further cause the IHS to:
determine that the at least one operational data storage drive should be replaced based, at least in part, on the probability of failure for the at least one operational data storage drive and the risk profile for the system of data storage drives.

6. The IHS of claim 3, wherein the risk profile comprises a bathtub curve risk profile that represents a failure rate for the system of data storage drives.

7. The IHS of claim 3, wherein the program instructions, upon execution by the processor, further cause the IHS to:
- determine a threshold probability of failure for the at least one operational data storage drive based, at least in part, on the risk profile for the system of data storage drives;
- determine that the probability of failure for the at least one operational data storage drive is greater than the threshold probability of failure for the at least one operational data storage drive; and
- determine to replace the at least one operational data storage drive based, at least in part, on a determination that the probability of failure for the at least one operational data storage drive is greater than the threshold probability of failure.

8. The IHS of claim 3, wherein the program instructions, upon execution by the processor, further cause the IHS to:
- determine a threshold probability of failure for the at least one operational data storage drive based, at least in part, on the risk profile for the system of data storage drives;
- determine that the probability of failure for the at least one operational data storage drive is less than the threshold probability of failure for the at least one operational data storage drive; and
- determine to not replace the at least one operational data storage drive based, at least in part, on a determination that the probability of failure is less than the threshold probability of failure.

9. The IHS of claim 1, wherein the artificial intelligence or machine learning model comprises a trained data storage drive failure prediction machine learning model.

10. The IHS of claim 1, wherein the at least one failed data storage drive and the at least one operational data storage drive are hard disk drives, and wherein the system of data storage drives comprises a plurality of hard disk drives within a same chassis or rack.

11. The IHS of claim 1, wherein the engineered features related to the system of data storage drives comprise at least one of: (1) an operational time average of the data storage drives in the system; (2) a number of data storage drive failures in the system over a life span; (3) a number of data storage drive failures in the system during a first year of operation; (4) a number of data storage drive failures in the system after five years of service; (5) a number of data storage drive failures in the system between one year and five years of service; (6) a number of data storage drive failures in the system in a previous 7 days; (7) a number of data storage drive failures in the system in a previous 30 days; (8) a number of data storage drive failures in the system in a previous 60 days; (9) a number of data storage drive failures in the system in a previous 90 days; (10) a number of data storage drive failures in the system in a previous 120 days; (11) a number of data storage drive failures in the system in a previous 180 days; (12) a standard deviation of disk capacity used for each data storage drive in the system of data storage drives; or (13) a standard deviation of disk capacity used for all data storage drives in the system of data storage drives.

12. The IHS of claim 1, wherein the data attributes of the plurality of data storage drives further comprise at least one of: (1) at least some Self-Monitoring, Analysis, and Reporting Technology ("SMART") sensor data; (2) disk error logs; or (3) disk utilization data.

13. A method, comprising:
- generating, during an inference phase using an artificial intelligence or machine learning model trained with training data comprising sensor data captured from a reference population of data storage drives, a probability of failure for each data storage drive of a system comprising a plurality of data storage drives, the probability of failure determined by the artificial intelligence or machine learning model as a function of live real-time data comprising sensor data captured from the plurality of data storage drives, wherein the training data and the live real-time data include at least: temperature, spin-up time, and number of reallocated sectors;
- deriving a risk profile that defines a failure rate as a function of time for the plurality of data storage drives;
- determining that at least one data storage drive of the plurality of data storage drives within the system is at least one failed data storage drive and at least one data storage drive of the plurality of data storage drives within the system is an operational data storage drive; and
- in response to determining that the probability of failure for at least one operational data storage drive is greater than a threshold probability of failure determined as a function of time of failure based at least in part on the risk profile for the plurality of data storage drives, dispatching a replacement for the at least one failed data storage drive and the at least one operational data storage drive.

14. The method of claim 13, further comprising:
- obtaining data attributes of the plurality of data storage drives; and
- generating, based at least in part on the data attributes, engineered features related to the plurality of data storage drives;
- wherein generating the probability of failure for the data storage drives further comprises:
  - generating, using the artificial intelligence or machine learning model, and based at least in part on the engineered features, the probability of failure for the data storage drives.

15. The method of claim 14, wherein the engineered features related to the plurality of data storage drives comprise at least one of: (1) an operational time average of the plurality of data storage drives in the system; (2) a number of data storage drive failures in the system over a life span; (3) a number of data storage drive failures in the system during a first year of operation; (4) a number of data storage drive failures in the system after five years of service; (5) a number of data storage drive failures in the system between one year and five years of service; (6) a number of data storage drive failures in the system in a previous 7 days; (7) a number of data storage drive failures in the system in a previous 30 days; (8) a number of data storage drive failures in the system in a previous 60 days; (9) a number of data storage drive failures in the system in a previous 90 days; (10) a number of data storage drive failures in the system in a previous 120 days; (11) a number of data storage drive failures in the system in a previous 180 days; (12) a standard deviation of disk capacity used for each data storage drive in the system of data storage drives; or (13) a standard deviation of disk capacity used for all data storage drives in the system of data storage drives.

16. The method of claim 13, wherein the risk profile comprises a bathtub curve risk profile that represents a failure rate for the plurality of data storage drives.

17. One or more non-transitory computer-readable storage media storing program instructions configured to, upon execution by one or more processors, cause the one or more processors to perform operations comprising:
  generate, during an inference phase using an artificial intelligence or machine learning model trained with training sensor data comprising storage drive temperature and storage drive spin-up time, the training sensor data captured from a population of data storage drives, a probability of failure for a first data storage drive of a system of data storage drives, the probability of failure determined by the artificial intelligence or machine learning model as a function of operational data comprising sensor data captured from the first data storage drive;
  derive a risk profile for the system of data storage drives;
  determine a replacement need for a second data storage drive based, at least in part, on the probability of failure for the first data storage drive and the risk profile for the system of data storage drives; and
  in response to a determination that the second data storage drive has a replacement need, dispatch a replacement for the second data storage drive.

18. The one or more non-transitory computer-readable storage media of claim 17, wherein further program instructions, upon execution by the one or more processors, further cause the one or more processors to perform further operations comprising:
  obtain data attributes of the first data storage drive; and
  generate, based at least in part on the data attributes, of the first data storage drive, engineered features related to the system of data storage drives;
  wherein to generate the probability of failure for the first data storage drive, the program instructions further cause the one or more processors to:
    generate, using the artificial intelligence or machine learning model, and based at least in part on the engineered features, the probability of failure for the first data storage drive.

19. The one or more non-transitory computer-readable storage media of claim 18, wherein the engineered features related to the system of data storage drives further comprise at least one of: (1) an operational time average of the data storage drives in the system; (2) a number of data storage drive failures in the system over a life span; (3) a number of data storage drive failures in the system during a first year of operation; (4) a number of data storage drive failures in the system after five years of service; (5) a number of data storage drive failures in the system between one year and five years of service; (6) a number of data storage drive failures in the system in a previous 7 days; (7) a number of data storage drive failures in the system in a previous 30 days; (8) a number of data storage drive failures in the system in a previous 60 days; (9) a number of data storage drive failures in the system in a previous 90 days; (10) a number of data storage drive failures in the system in a previous 120 days; (11) a number of data storage drive failures in the system in a previous 180 days; (12) a standard deviation of disk capacity used for each data storage drive in the system of data storage drives; or (13) a standard deviation of disk capacity used for all data storage drives in the system of data storage drives.

20. The one or more non-transitory computer-readable storage media of claim 17, wherein the risk profile further comprises a bathtub curve risk profile that represents a failure rate determined as a function of time for the system of data storage drives.

* * * * *